Sept. 16, 1924.  1,508,730
A. T. SPROWL
LIQUID FUEL BURNER
Filed Dec. 21, 1922   2 Sheets-Sheet 1
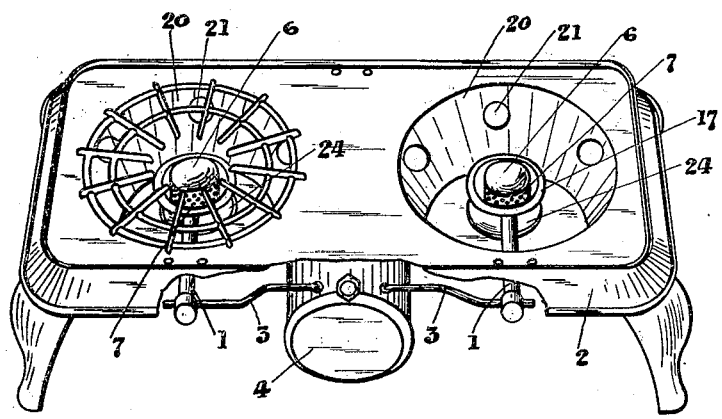
Fig. 1.
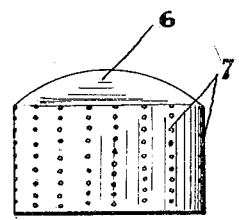
Fig. 3.   Fig. 5.
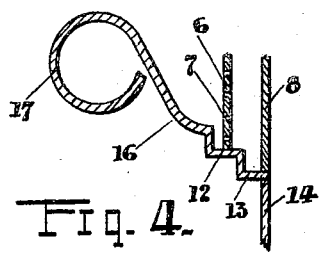
Fig. 4.
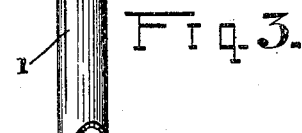
Inventor
A. T. Sprowl.
By
Attorney Sept. 16, 1924.  1,508,730
A. T. SPROWL
LIQUID FUEL BURNER
Filed Dec. 21, 1922   2 Sheets-Sheet 2

Inventor
A. T. Sprowl.

Patented Sept. 16, 1924.

1,508,730

UNITED STATES PATENT OFFICE.

ARTHUR TAYLOR SPROWL, OF SACRAMENTO, CALIFORNIA.

LIQUID-FUEL BURNER.

Application filed December 21, 1922. Serial No. 608,186.

*To all whom it may concern:*

Be it known that I, ARTHUR TAYLOR SPROWL, a resident of the city of Sacramento, county of Sacramento, and State of California, and a citizen of the United States, have invented certain new and useful Improvements in Liquid-Fuel Burners, of which the following is a specification, reference being had to the accompanying drawings, forming a part thereof.

My invention relates to liquid fuel burners and particularly to burners adapted for use in connection with stoves for cooking or heating purposes in which the liquid fuel is volatilized by heat within a generator tube or container and discharged therefrom in the form of gas or vapor and mixed with air before it is burned.

My invention has for its object to provide a burner of this general class which will be simple and inexpensive in construction and effective in operation and in which all of the parts of the burner will be readily accessible for cleaning or repair. A further object of the invention is to provide a burner in which the generator will be effectively heated by the flame to volatilize the liquid fuel and in which the mixing of the vaporized or gasified fuel with air may be so effected as to form mixture which will burn without deposit of carbon. A further object of the invention is to provide means for so effecting the preliminary heating of the burner that it will be brought to the full heat required for the volatilization of the fuel before it begins to operate. A further object of the invention is to provide a burner so constructed as to prevent the back-firing and so that any harmful effect from back-firing will be prevented.

With the above objects indicated and other objects hereinafter explained in view my invention consists in the construction and combination of elements hereinafter described and claimed.

Referring to the drawings:

Figure 1 is a perspective view of a stove provided with burners embodying my invention.

Figure 3 is a top plan view of the burner.

Figure 4 is a detail vertical sectional view of a portion of the burner showing the steps on which the inverted cups rest.

Figure 5 is a side view of the upper inverted cup.

Figure 6 is a horizontal sectional view on line 6—6 of Figure 2.

Figure 7 is a vertical sectional view on an enlarged scale of the nozzle and valve on the same plan as that on which Figure 2 is taken.

Figure 8 is a vertical cross sectional view through the nozzle at right angles to Figure 7.

Figure 2:
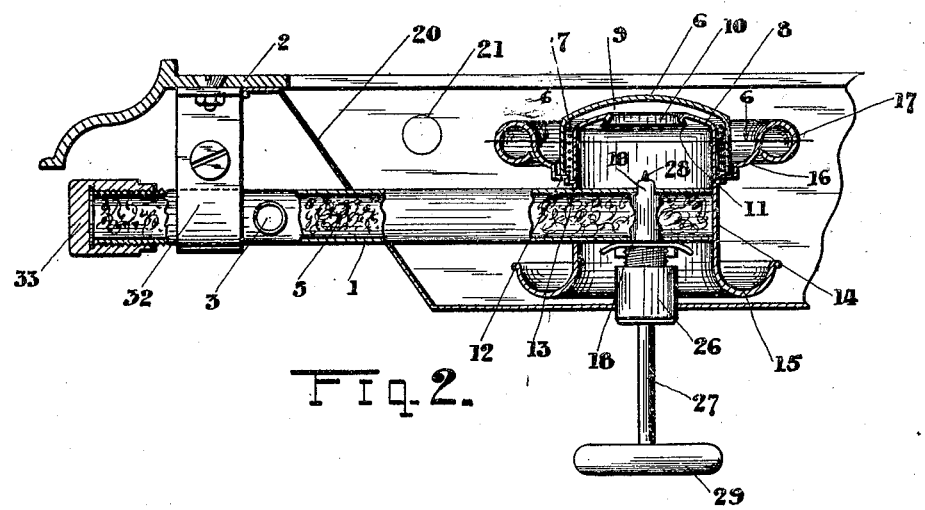
Figure 2 is a vertical sectional view on an enlarged scale on the plane passing through the centre of one of the burners and the generator tube.
Figures 6, 7, 8:
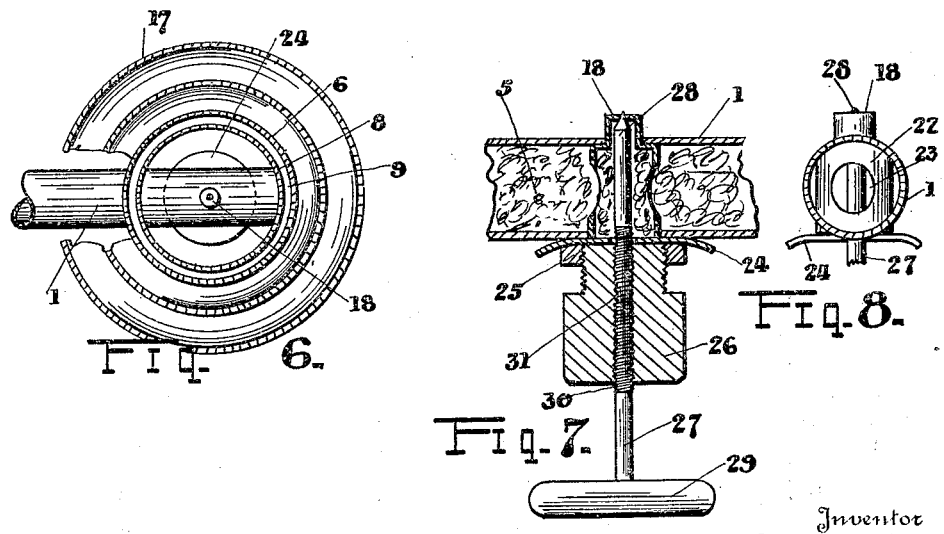

In the drawings 1 indicates a generator tube extending horizontally inward from the frame or stand 2 of the stove, and is supplied with oil at a point near its outer end through a tube 3 leading from a reservoir 4. The generator tube is filled with fibrous or porous material 5 such as asbestos. At the inner end of this generator tube 1 is carried the burner in which gas or vapor generated in the generator is first mixed with air and the mixture discharged and burned.

The burner comprises an outer inverted cup 6 having perforations 7 in its sides for the escape of the gaseous mixture. Within this inverted cup 6 is a smaller inverted cup 8 corresponding in shape with it but so much smaller that a space or passage 9 is left between the bottoms and sides of the two inverted cups. At the centre of the bottom (which is its top when in position) of this inner cup is a central opening 10 the edge of which is turned inward and downward to form the flange 11. The inverted cups rest at their edges on annular shoulders 12 and 13 respectively of the outer member of the burner.

This outer member is circular in cross section and comprises a vertical wall 14, an annular trough or cup 15 below and continuous with the vertical wall, the shoulders 12 and 13 above the vertical wall, and an upper annular trough or cup 16 the upper outer portion of which is curved or rolled to form a hollow ring 17 which may be termed a conduction chamber.

The inner portion of the generator tube 1 extends through the vertical wall 14 on one side and its end abuts against this vertical wall on the opposite side of the centre. Carried by the generator tube, at the centre of the burner is a nozzle 18 through which gas or oil vapor generated from the oil in the generator tube is discharged upward and is mixed within the mixing chamber formed by the inner inverted cup 8, with air which enters from below at the sides of the portion of the generator tube which extends across the vertical portion 14. The mixture of gas, or oil vapor, and air passes upward through the opening 10, into the space or passage 9, downward between the sides of the cups and, through the perforations 7, outward into the upper annular trough or cup 16 where it is ignited. The flange tends to impinge upon the inside of the hollow ring 17 and to bring it to a high heat. The flange 11 serves to turn back any globules of oil that may be carried with the gas or vapor discharged from the nozzle 18.

The burner is arranged within a pan 20 carried by frame 2 and preferably provided with openings 21. The generator tube 1 extends through the wall of this pan 20.

The heat from the hollow ring 17 is radiated outward and downward acting directly upon the generator tube 1 and also by reflection from the walls of the pan 20 and is sufficient to cause the oil within this generator tube to be vaporized.

The outer member of the burner is so arranged that the annular cup 15 is sufficiently above the bottom of the pan 20 to permit air to enter freely to pass upward past the sides of the generator tube.

The nozzle 18 is arranged at the upper end of a vertical tube 22 which extends upward through, and at right angles to the generator tube 1, and is provided in its sides within the generator tube with openings 23 into which the gas or oil vapor passes. At its lower end, outside the generator tube the vertical tube 22 is provided with a circular deflector plate 24 convex in its upper face for deflecting outward any oil that may drip from the nozzle. On the under side of this deflector plate is arranged a collar 25 to receive a screw thread on the upper end of nut 26 through which passes the valve stem 27 carrying at its upper end the valve 28 which extends through the opening 28 which extends through the opening of the nozzle 18. The valve stem is provided at its lower end with the hand wheel 29 and is of such length that the hand wheel is well below the bottom of the pan 20. The valve stem is screwthreaded at 30 to engage the screwthreads 31 of the nut 26.

The generator tube 1 is supported near its outer end by a strap or clip 32 secured to and depending from the frame 2, and is provided at its outer end with a screwcap 33.

The annular trough or cup 15 is preferably partly filled with asbestos fibre or other incombustible fibrous material. In order to start the burner into operation this annular trough or cup 15 is supplied with oil or gasoline and this is ignited. The flame from this heats the generator tube and also heats up the burner and the hollow ring 17. As soon as the generator tube becomes sufficiently heated, which will be a matter of not more than a minute or two the hand wheel 29 may be turned to permit the gas or vapor from the generator tube to be discharged through the nozzle 18 and to be mixed with air within the inverted cup 8. The mixture thus formed passes upward through the opening 10 into the space or passage 9 and out through the perforations 7 and passing over the annular ring 17 is ignited by the flame from the annular trough or cup 15. The burner will then continue to operate until the nozzle 18 is closed by means of the hand wheel 29.

The nut 26 extends through a suitable opening in the bottom of the pan 20. The deflector plate 24 deflects away from the opening into the bottom of the pan, any oil which may drip from the nozzle or from the mixing chamber.

The inner end of the generator tube which abuts against the inside of the vertical portion 14 of the outer member of the burner is securely brazed to it so that there will be no leakage of oil, gas or oil vapor. The vertical tube 22 is also securely brazed in position in the generator tube. The inverted cups 6 and 8 held against lateral displacement by the shoulders 12 and 13 but may be readily lifted off when it is desired to clean the burner. By lifting off both of the cups access is given to the nozzle. By unscrewing the nut 26 from the collar 25 the valve stem 27 with valve 28 may be withdrawn for cleaning. All parts of the burner are thus made readily accessible for cleaning without the use of tools. By making the perforations 7 in the sides of the outer inverted cup 6 relatively small but numerous free escape of the mixture formed in the mixing chamber is provided and at the same time any tendency of the flame to jump backward into the mixing chamber is prevented. The only result of such back-firing, if it did occur would be to throw off the inverted cups without injury to the other parts of the burner.

Having thus described my invention what I claim is:

1. In a liquid fuel burner, an outer member of substantial vertical extent open at top and bottom, having its mid portion cylindrical and provided above the cylindrical portion with a seat adapted to support the edge of an inverted cup and having the portion below the cylindrical portion turned outward and upward to form an annular trough, a generator tube extending through one side of the cylindrical portion and provided within said cylindrical portion with a discharge opening, and an inverted cup having its edge resting on said seat and provided with perforations in its sides.

2. In a liquid fuel burner, an outer member of substantial vertical extent open at top and bottom, having its mid portion cylindrical and provided above the cylindrical portion with a seat adapted to support the edge of an inverted cup and having the portion above the seat extending outward and provided with an annular heat retaining ring, a generator tube extending through one side of the cylindrical portion and provided within said cylindrical portion with a discharge opening, and an inverted cup having its edge resting on said seat and provided with perforations in its sides.

3. In a liquid fuel burner, an outer member of substantial vertical extent open at top and bottom, having its mid portion cylindrical and provided above the cylindrical portion with a seat adapted to receive the edge of an inverted cup and having the portion above the seat extending outward and provided with an annular heat retaining ring and having the portion below the cylindrical portion turned outward and upward to form an annular trough, a generator tube extending through one side of the cylindrical portion and provided within said cylindrical portion with a discharge opening, and an inverted cup having its edge resting on said seat and provided with perforations in its sides.

4. In a liquid fuel burner, an outer member of substantial vertical extent open at top and bottom, having its mid portion cylindrical and provided above the cylindrical portion with concentric seats adapted to receive the edges of inverted cups and having the portion above the seats extending outward, a generator tube extending through one side of the cylindrical portion and provided within said cylindrical portion with a discharge opening, concentric inverted cups having a space between them, having their edges resting on said seats, the outer cup being provided with perforations in its sides and the inner cup being provided in its bottom with an opening communicating with the space between the cups.

5. In a liquid fuel burner, an outer member of substantial vertical extent open at top and bottom, having its mid portion cylindrical and provided above the cylindrical portion with concentric seats adapted to receive the edges of inverted cups and having the portion above said seats extending outward and provided with an annular heat retaining ring, a generator tube extending through one side of said cylindrical portion and provided within said cylindrical portion with a discharge opening, concentric inverted cups having a space between them, having their edges resting on said seats, the outer cup being provided with perforations in its sides and the inner cup being provided with an opening in its bottom communicating with the space between the cups and having a downwardly extending flange surrounding said opening.

6. In a liquid fuel burner, an outer member of substantial vertical extent open at top and bottom, having its mid portion cylindrical and having the portion above the cylindrical portion provided with concentric seats adapted to receive the edges of inverted cups and having the portion above said seats extending outward and provided with an annular heat retaining ring and having the portion below the cylindrical portion turned outward and upward to form an annular trough, a generator tube extending through one side of the cylindrical portion and provided within said cylindrical portion with a discharge opening, concentric inverted cups having a space between them having their edges resting on said seats, the outer cup having perforations in its sides and the inner cup having an opening in its bottom communicating with the space between the cups.

7. In a liquid fuel burner, an outer member of substantial vertical extent open at top and bottom, an inverted cup carried by the outer member at its upper end, having perforations in its sides, a generator tube extending into the outer member below the inverted cup and having a discharge opening in line with the centre of the cup adapted to discharge vaporized fuel into the inverted cup from below, and heat retaining means carried by the outer member in position to be heated by flame from the perforations in the sides of the cup and adapted to heat the generator tube.

8. In a liquid fuel burner, an outer member of substantial vertical extent open at top and bottom, an inverted cup carried by the outer member at its upper end, having perforations in its sides, a generator tube extending into the outer member below the inverted cup and having a discharge opening adapted to discharge vaporized fuel into the inverted cup from below, and an annular trough carried by the outer member below the generator tube adapted to contain liquid fuel for preheating the generator tube.

9. In a liquid fuel burner, a generator tube, a burner at its inner end comprising an outer member open at top and bottom having at its upper end an inverted cup provided with perforations in its sides and having about the inverted cup at a distance therefrom a heat retaining ring above the generator tube in position to be heated by flame from the perforations in the inverted cup and to radiate heat against the generator tube, the generator tube being provided within the outer member of the burner with a discharge opening adapted to discharge vaporized fuel upward into the inverted cup, means for regulating the discharge comprising a valve and a valve stem extending downward through the bottom of the pan and provided below the bottom of the pan with means for operating it, the outer member of the burner being also provided below the generator tube with a trough adapted to contain liquid fuel for preheating.

In testimony whereof I hereunto affix my signature.

ARTHUR TAYLOR SPROWL.